July 5, 1927.

H. K. SANDELL 1,634,853

TRANSFORMING SYSTEM

Filed March 27, 1924

Inventor:
Henry K. Sandell,
By Dyrenforth, Lee, Chritton & Wiles
Attys

Patented July 5, 1927.

1,634,853

UNITED STATES PATENT OFFICE.

HENRY K. SANDELL, OF CHICAGO, ILLINOIS.

TRANSFORMING SYSTEM.

Application filed March 27, 1924. Serial No. 702,299.

This invention relates to transformers and the like and is particularly adapted for transforming direct current into alternating current with a high degree of efficiency.

The invention is fully described in the following specification and shown in the accompanying drawings in which.

The embodiment illustrated comprises a transformer 10 having a laminated core 11 formed in the shape of a hollow rectangle or O, about the opposite sides of which are wound the primary winding 12 and the secondary winding 13.

Figure 1:
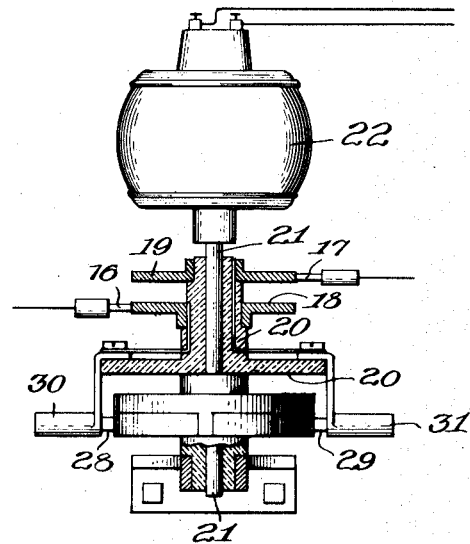
Figure 1 is a top plan view of a rotating reversing switch partly in section.

The two ends of the primary 12 are connected to leads 14 and 15 to the two brushes 16 and 17 which bear upon the metal slip rings 18 and 19 which are carried by the insulating rotating member 20 which is carried by the shaft 21 of the motor 22 as shown in Fig. 1.

Figure 2:
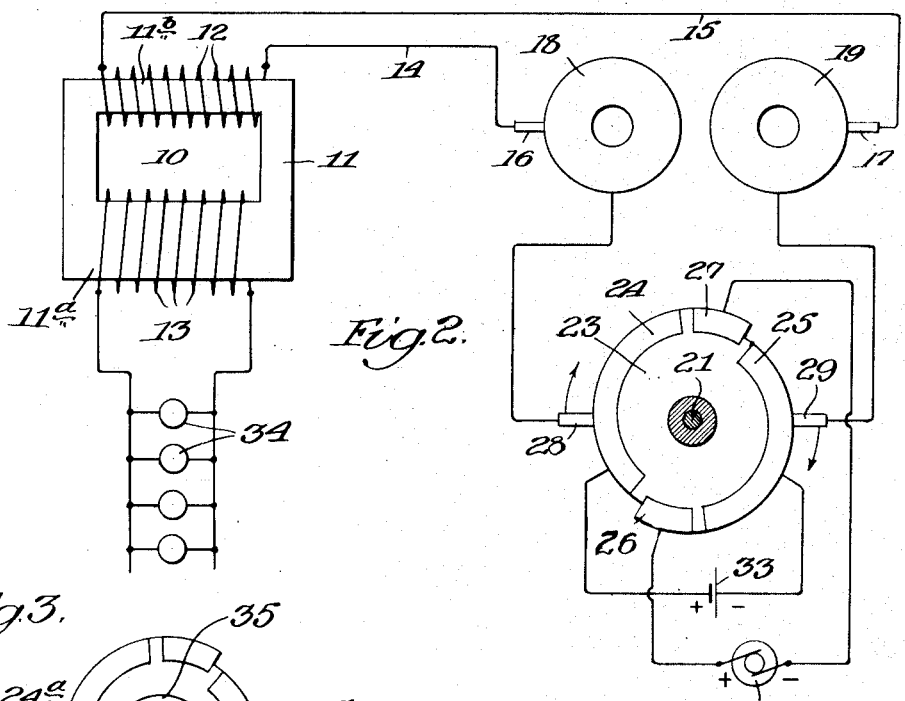
Fig. 2 is a diagrammatic view of a circuit embodying this switch connected to a transformer element.

The frame of the motor also carries a stationary insulating block 23 to which are secured opposing metal segments 24, 25, 26 and 27 which are insulated from each other. Brushes 28 and 29 are carried in suitable holders 30 and 31 on the block 20 so that as the latter revolves the brushes 28 and 29 are moved above the segments as shown in Fig. 2 in a clockwise direction. The segments 26 and 27 are preferably raised somewhat above the succeeding ends of the segments 24 and 25 for a purpose which will later be apparent.

The segments 26 and 27 are connected to a source 32 of relatively high voltage current so that as the brushes 28 and 29 make contact with these segments, an energizing current will pass through the slip ring 18, the brush 16, the lead 14, and the primary coil 12, reversing the same, the current passing through the lead 15, the brush 17, the slip ring 19, brush 29, to the segment 26 and thus back to the source of current 32.

As the shaft 21 continues to revolve in a clockwise direction the brushes 28 and 29 will jump off the raised segments 26 and 27 and will land on the segments 24 and 25 which are connected to a source 33 of low voltage supply. The direction of flow of current from the lower source 33 will be the same as that from the high voltage source 32 so that the low voltage current will tend to maintain the field in the core 11 which has been energized by current from the source 32.

After the brushes 28 and 29 have passed the segments 24 and 25, they again make contact with the segments 26 and 27, but in a reversed position so that current now flows through the primary coil 12 in the opposite direction, thereby magnetizing the core 11 with a reversed polarity.

These reversals of magnetization of the core 11 generate an alternating current in the secondary coil 13, which may be made use of, for example, to light the lamps 34. By making the cross section of the core $11^a$ about which the secondary coil 13 is wound larger than the core $11^b$ about which the primary 12 is wound, an increased efficiency of the transformer is obtained.

Figure 3:
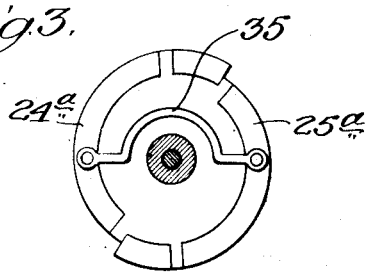
Fig. 3 is a modified form of the switch.

In Fig. 3 is shown a modified form of the device in which the segments $24^a$ and $25^a$ are connected through a lead 35. This permits the current to flow through the primary 12 which current is generated by a collapse of lines of force in the core 11 and which tends to maintain the magnetism in that core beyond what would obtain therein if no current were flowing in the primary coil 12 at this time.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. A transforming system comprising a magnetic core of O-shape, one side being of larger cross sectional area than the other, primary and secondary windings thereon, the primary being on the side of smaller cross section, a source of high voltage direct current, means for intermittently passing said current through said primary winding in alternately reversed directions, and means for connecting the free ends of the primary winding to permit a current to flow after the energizing current has been cut off.

2. A transforming system comprising a magnetic core of O-shape, one side being of larger cross sectional area than the other, primary and secondary windings thereon, the primary being on the side of smaller cross section, a source of high voltage direct current, means for intermittently passing said current through said primary winding in alternately reversed directions, and a source of low voltage current connecting the free ends of the primary winding after the energizing current has been cut off, the low voltage current flowing in the same direction as the energizing current.

HENRY K. SANDELL.